(12) United States Patent
Osvath et al.

(10) Patent No.: US 6,280,599 B1
(45) Date of Patent: Aug. 28, 2001

(54) ELECTROCHEMICAL TREATMENT OF ION EXCHANGE MATERIAL

(75) Inventors: Peter Osvath, South Yarra; Alastair Hodges, Blackburn, both of (AU)

(73) Assignee: CRC for Waste Management and Pollution Control Limited, Kensington (AU)

(*) Notice: Subject to any disclaimer, the term of this patent is extended or adjusted under 35 U.S.C. 154(b) by 0 days.

(21) Appl. No.: 09/331,488

(22) PCT Filed: May 8, 1998

(86) PCT No.: PCT/AU98/00336

§ 371 Date: Aug. 12, 1999

§ 102(e) Date: Aug. 12, 1999

(87) PCT Pub. No.: WO98/51621

PCT Pub. Date: Nov. 19, 1998

(30) Foreign Application Priority Data

May 9, 1997 (AU) .................................................. PO6715

(51) Int. Cl.$^7$ ................................................. B01D 61/44
(52) U.S. Cl. ........................... 205/688; 204/536; 204/632
(58) Field of Search ........................ 205/688; 204/536, 204/632

(56) References Cited

U.S. PATENT DOCUMENTS 2,763,607 * 9/1956 Staverman ......................... 205/688
2,812,300 * 11/1957 Pearson .
3,006,828 * 10/1961 Gaysowski ......................... 205/688
5,954,935 * 9/1999 Neumeister et al. ................ 204/632

FOREIGN PATENT DOCUMENTS 1003955    9/1965  (GB) .

* cited by examiner

Primary Examiner—Arun S. Phasge
(74) Attorney, Agent, or Firm—Morgan, Lewis & Bockius LLP

(57) ABSTRACT

A method of treating an ion exchange material, the method including: (a) positioning at least two regions of ion exchange material between an anode and cathode electrode, wherein at least a portion of the two regions being in electrical contact and being separated by a non-ion specific permeable interface; (b) supplying water to the at least two regions; (c) applying an electric potential between the electrodes thereby causing generation of hydrogen ions at the anode and hydroxide ions at the cathode, which ions are caused to move through each region towards the oppositely-charged electrode and thereby displacing at least a portion of any anions or cations associated with the ion exchange material in each region such that the displaced anions and cations are also caused to move through the regions towards the oppositely charged electrode; and (d) removing at least some of the cations and/or anions formed during step (c) which reach the interface.

20 Claims, 9 Drawing Sheets

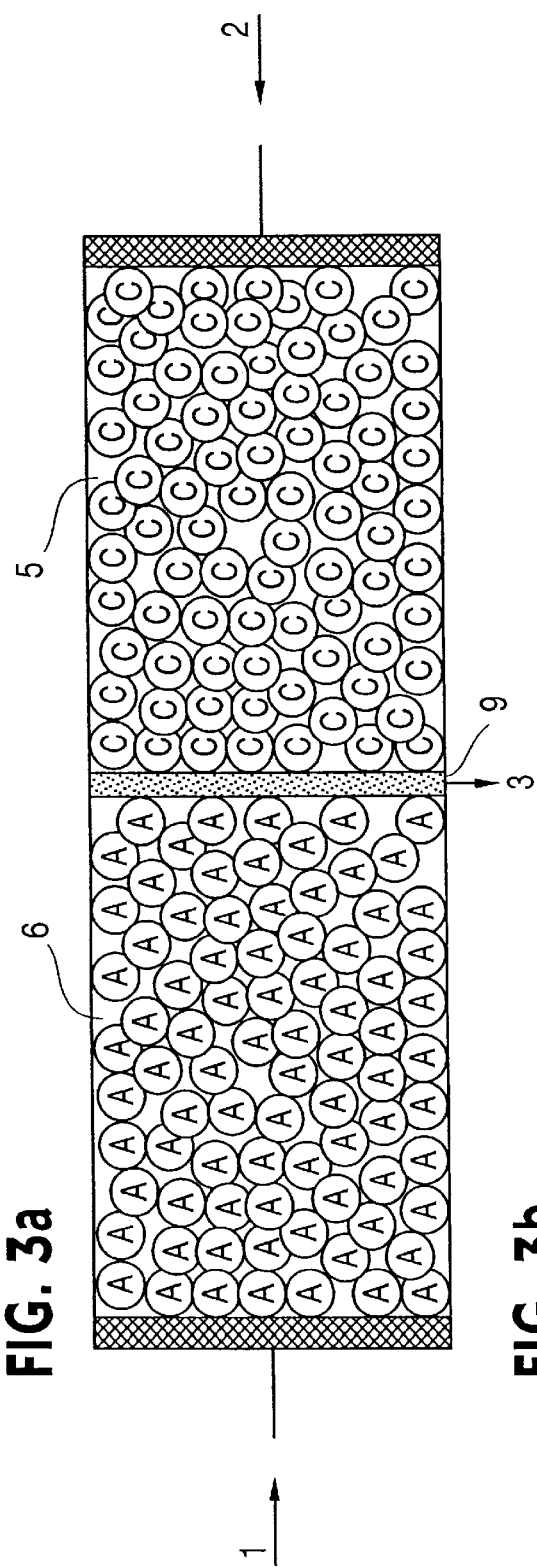
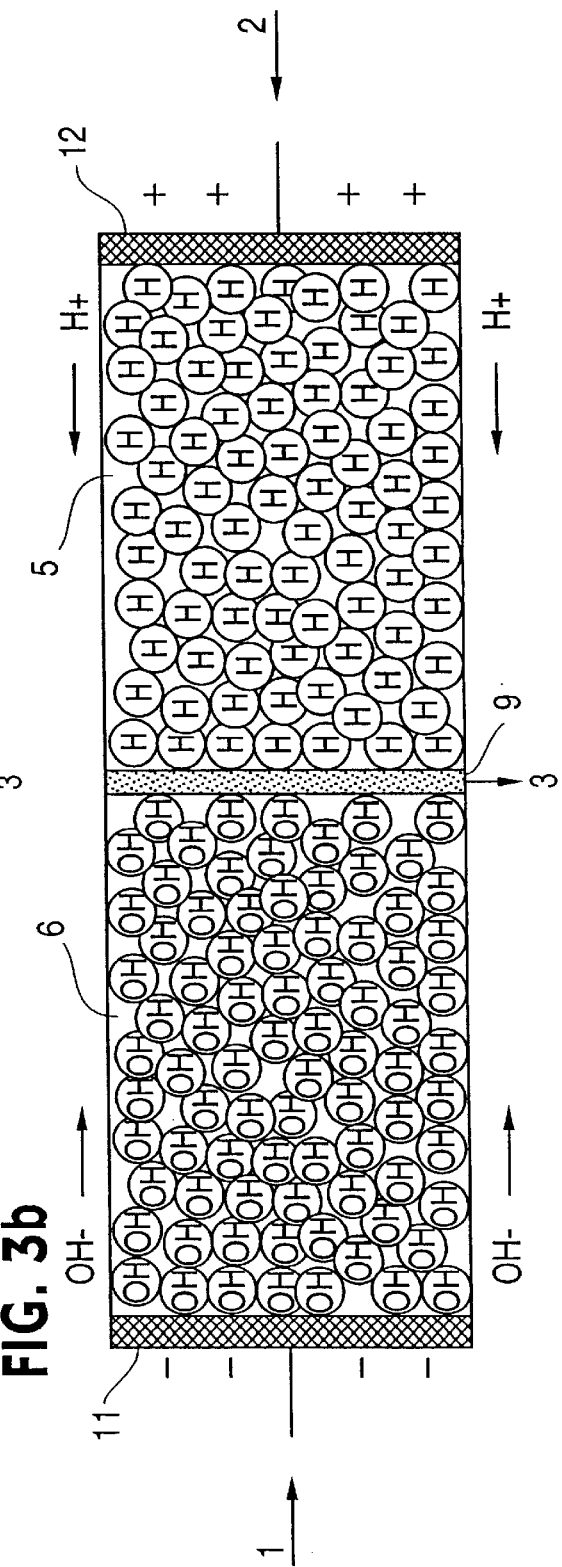

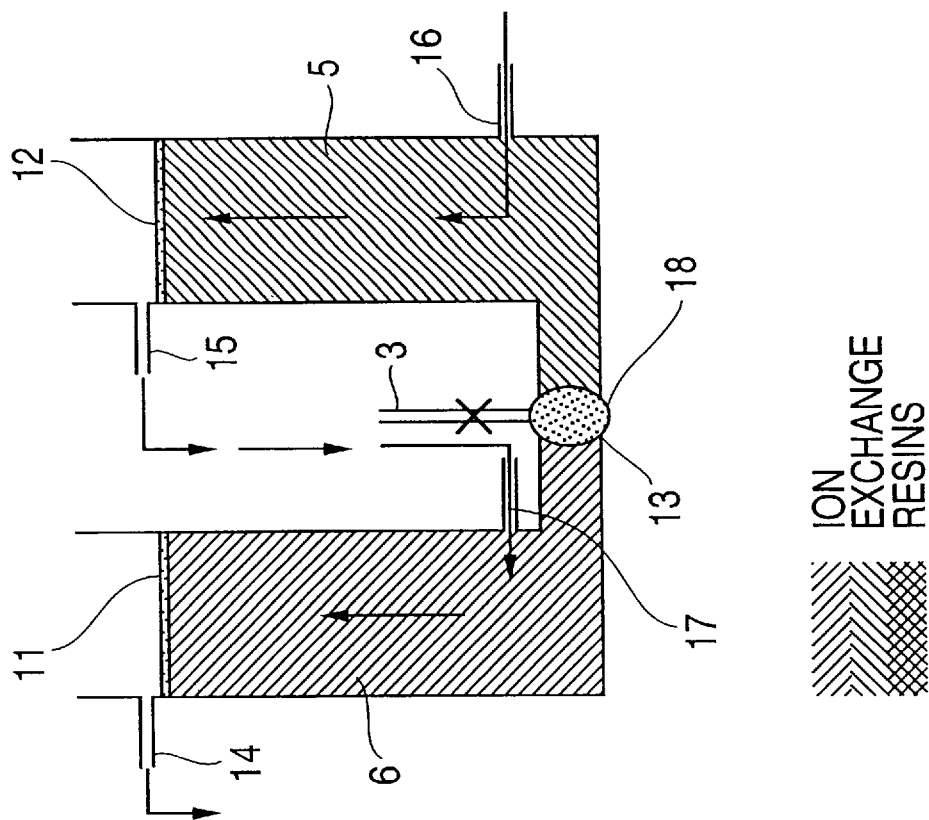
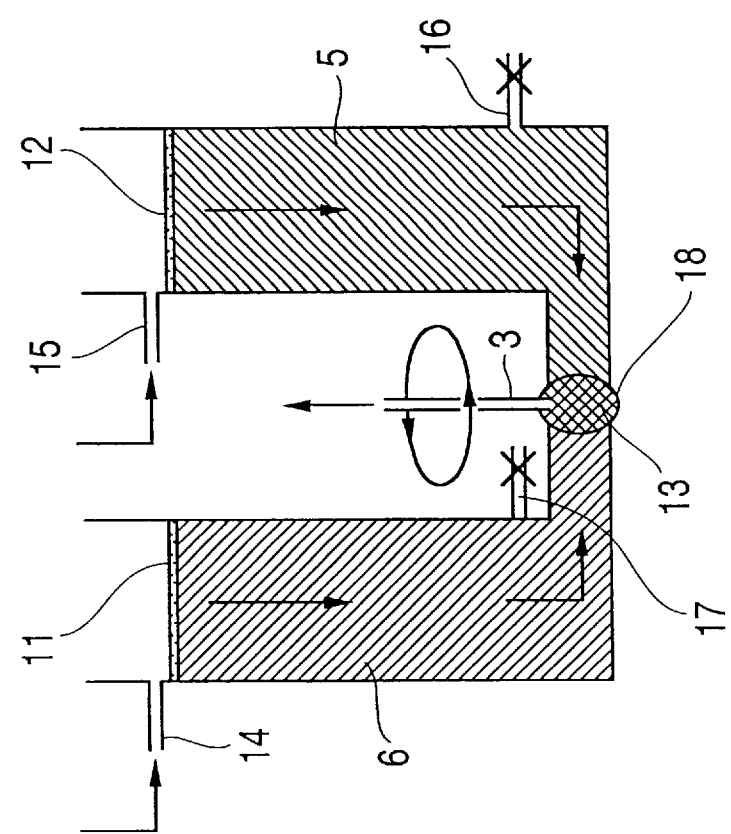

ELECTROCHEMICAL TREATMENT OF ION EXCHANGE MATERIAL

This application is a 371 of PCT/AU98/00336 filed May 8, 1998.

TECHNICAL FIELD

The present invention relates generally to water treatment with ion exchange materials and particularly to methods and apparatus for the electrochemical treatment of anion and cation exchange resins.

BACKGROUND ART

Ion exchange is the reversible interchange of ions between a solid (often termed resin) and a liquid in which there is no permanent change in the structure of the solid that is the ion exchange material. The utility of ion exchange rests with the ability to use and reuse the ion exchange materials, employing an appropriate regeneration step.

There is an enormous market for high purity water. It is used extensively in industrial applications, with notable major users including the pharmaceutical, electronics and power generation industries.

In the final treatment (polishing step) for most applications, dissolved salts are commonly removed from the water by passage through ion exchange materials or resins. A combination of a cation exchange resin (in the $H^+$ form) and an anion exchange resin (in the $OH^-$ form) are used to remove the cations and anions, respectively. Two beds, one containing each resin type, may be used in tandem for the removal of many salts. If the aqueous solution is first passed through a bed of cation exchange resin (in the $H^+$ form), the cations in the solution are taken up by the cation exchanger, and an equivalent amount of $H^+$ ions art released into the solution (thus preserving electroneutrality). This (now acidic) solution is then passed through a second bed of anion exchange resin (in the $OH^-$ form), and the anions in the solution are taken up by the anion exchanger. The $OH^-$ that is released neutralises the $H^+$ in the solution thereby forming water. After passage through the two beds, the dissolved salts have effectively been removed from the solution. (If the sequence of the desalting is reversed, a corresponding scenario, with an intermediate alkaline solution, will apply).

For a number of water purification applications, a mixed bed of ion exchange resin is preferable, either in the place of the tandem bed configuration, or in addition to it, as a final polishing step. In this case, the cation and anion resins are intimately mixed, and the cations and anions are removed from the solution at the same time, with immediate neutralisation of the $H^+$ and $OH^-$ released by the resins forming water. It is possible to achieve a greater level of salt removal from aqueous solutions with this configuration, as the chemical equilibrium process is "driven" by the loss of $H^+$ and $OH^-$ by mutual neutralisation.

In either configuration, once the resins are exhausted (i.e. once there is no more resin in the $H^+$ and $OH^-$ forms), the cation and anion beds must be regenerated. For the conventional chemical regeneration processes, the cation and anion resins in the mixed resin bed must be physically separated before chemical regeneration can be carried out. This regeneration is usually by treatment with acid (typically $H_2SO_4$) and alkali (typically $NaOH$), respectively. This chemical process involves the storage and handing of concentrated acid and caustic solutions, as well as the disposal of the effluent regeneration and wash solutions after use. This is undesirable in the point of view of cost, safety and environmental considerations.

Other methods not requiring harsh chemical treatment alone have been developed for the regeneration of ion exchange resins. Some of these methods include electro-deionisation systems utilising specific ion-permeable membranes and chemical treatment solutions. Often the membranes are expensive and can to leak or rupture during use. Furthermore, the apparatus needed to house the resins with the membranes can be expensive to produce and maintain. Other methods available are adapted only to regenerate cation or anion form of resin, thus requiring two systems to regenerate both forms of ion exchange material.

The present inventors have developed a method of treating ion exchange resins using mild, inexpensive and ecologically acceptable electrochemical techniques. This method does not require regenerating chemicals, and has the added advantage that the water purification process and ion exchange regeneration can be carried out in the same vessel, with no need to disturb the resin bed. In the case of the mixed bed systems, this process also has the advantage that the regeneration can be carried out on resin beds without needing to separate the cation exchange resin from the anion exchange resin.

DISCLOSURE OF INVENTION

In a first aspect, the present invention consists in a method of treating an ion exchange material, the method including:
(a) positioning at least two regions of ion exchange material between an anode and cathode electrode, wherein at least a portion of the two regions being separated by a non-ion specific permeable interface;
(b) supplying water to the at least two regions;
(c) applying an electric potential between the electrodes thereby causing generation of hydrogen ions at the anode and hydroxide ions at the cathode, which ions are caused to move through each region towards the oppositely-charged electrode and thereby displacing at least a portion of any anions or cations associated with the ion exchange material in each region such that the displaced anions and cations are also caused to move through the regions towards the oppositely charged electrode; and
(d) removing at least some of the cations and/or anions formed during step
(e) which reach the interface.

It will be appreciated that at least a portion of the two regions will be in electrical contact so that an electrical potential can be applied between the electrodes.

The two regions can include single or mixed forms of ion exchange material. It will be appreciated that when single forms of ion exchange material are placed in each region, it is necessary for efficient operation of the method that the anion exchange material is positioned in the region associated with the cathode and the cation exchange material is positioned in the region association with the anode.

In a preferred embodiment of the first aspect of the present invention, simultaneous electrochemical regeneration of the ion exchange material in the regions occurs.

The anions and cations associated with the ion exchange material and removed by the method are preferably salts. In one form, the salts have accumulated on the ion exchange material during treatment of water prior to carrying out the method according to the present invention to regenerate the ion exchange material.

The interface can be in any form which allows the removal or flushing of ions and water which reach thereto during the movement of ions under the influence of the electric potential. Suitable forms include, but not limited to, non-ion selective membrane, frit, porous spacer, cavity formed by physical separation of the two regions of ion exchange material, inert material, valve arrangement and physical boundary between the two regions. The physical boundary between the two regions may also form a suitable interface. Preferably, the interface is polypropylene frit associated with a valve to allow the removal of the ions and water.

Preferably, the cations and/or anions formed during step (c) are removed prior to crossing the interface and entering the other region of ion exchange material.

In one preferred form, the step (b) is used as a means to remove salts dissolved in water to be treated. The one or more regions are flushed with water to be treated such that any dissolved salts therein are bound to the ion exchange material. When the water-treatment process is completed and the ion exchange material is to be regenerated, steps (c) and (d) are then carried out. The distinct advantage of this form of water treatment process is that the ion exchange material can be regenerated in situ.

The anode is preferably formed of platinum coated titanium, whereas the cathode can be formed of platinum coated titanium or stainless steel. It will be appreciated, however, that the electrodes may be formed of any suitable material.

Step (d) can be carried out by any suitable means which results in removal of the ions and water from the interface and immediate surrounding area. One suitable means is to flush the interface with water for example. It will be appreciated, however, that any suitable means would be applicable.

In a second aspect, the present invention consists in an electrochemical cell comprising:
(a) an anode and cathode electrode;
(b) at least two regions adapted to contain ion exchange material, the regions being positioned between the electrodes,
(c) at least a portion of the two regions and being separated by a non-ion specific permeable interface;
(d) means for supplying water to the at least two regions;
(e) optionally, means for applying an electric potential between the electrodes; and
(f) means for removing ions, salts and water at the interface;

wherein, in use, applying an electric potential causes generation of hydrogen ions at the anode and hydroxide ions at the cathode, which ions are caused to move through each region towards the oppositely-charged electrode and thereby displacing at least a portion of any anions or cations associated with the ion exchange material in each region such that the displaced anions and cations are also caused to move through the regions towards the oppositely charged electrode; and at least some of the cations and/or anions formed which reach the interface are removed by the flushing means.

The electrochemical cell is particularly suitable for carrying out the method according to the first aspect of the present invention. The cell can be used to purify water by removing dissolved salts or for regenerating ion exchange materials placed in the regions thereof.

The anode is preferably formed of platinum coated titanium, whereas the cathode can be formed of platinum coated titanium or stainless steel. It will be appreciated, however, that the electrodes may be formed of any suitable material.

It will be appreciated that at least a portion of the two regions will be in electrical contact so that an electrical potential can be applied between the electrodes.

In a preferred form of the cell, the interface is positioned approximately equidistant between the two electrodes and the regions therebetween contain substantially the same volume or amount of ion exchange material.

The means for applying the electric potential can be any suitable power source. The amount of potential applied will depend on the type and amount of ion exchange material. Typically, for a cell containing XXXX of strong ion-exchanger, a current of YYYYY is applied for ZZZZZ minutes to achieve substantially complete regeneration of a fully exhausted ion exchange material. It will be appreciated that these values are only examples and will vary depending on the material, extent of exhaustion and volume used.

In a third aspect, the present consists in the use of the cell according to the second aspect of the present invention to regenerate ion exchange material.

In a fourth aspect, the present consists in the use of the cell according to the second aspect of the present invention to treat water to remove dissolved salts therefrom.

In contrast to the prior art, the present invention does not require anion and cation selective membranes for its operation. Rather, the regions or beds of ion exchange material are used as a barrier to the transport of the unwanted ions. The elimination of the need for ion-selective membranes is a considerable advantage over the prior art, leading to a simpler, more robust and less expensive system.

Throughout this specification, unless the context requires otherwise, the word "comprise", or variations such as "comprises" or "comprising", will be understood to imply the inclusion of a stated element, integer or step, or group of elements, integers or steps, but not the exclusion of any other element, integer or step, or group of elements, integers or steps.

In order that the present invention may be more clearly understood, preferred forms will be described with reference to the following examples and accompanying drawings.

BRIEF DESCRIPTION OF DRAWINGS

FIGS. 3a and 3b are schematics illustrating the operation of the electrochemical cell of FIG. 1;

FIGS. 8(a) & 8(b) are schematics of other embodiments of a electrochemical cell according to the invention.

MODES FOR CARRYING OUT THE INVENTION

Figure 1:
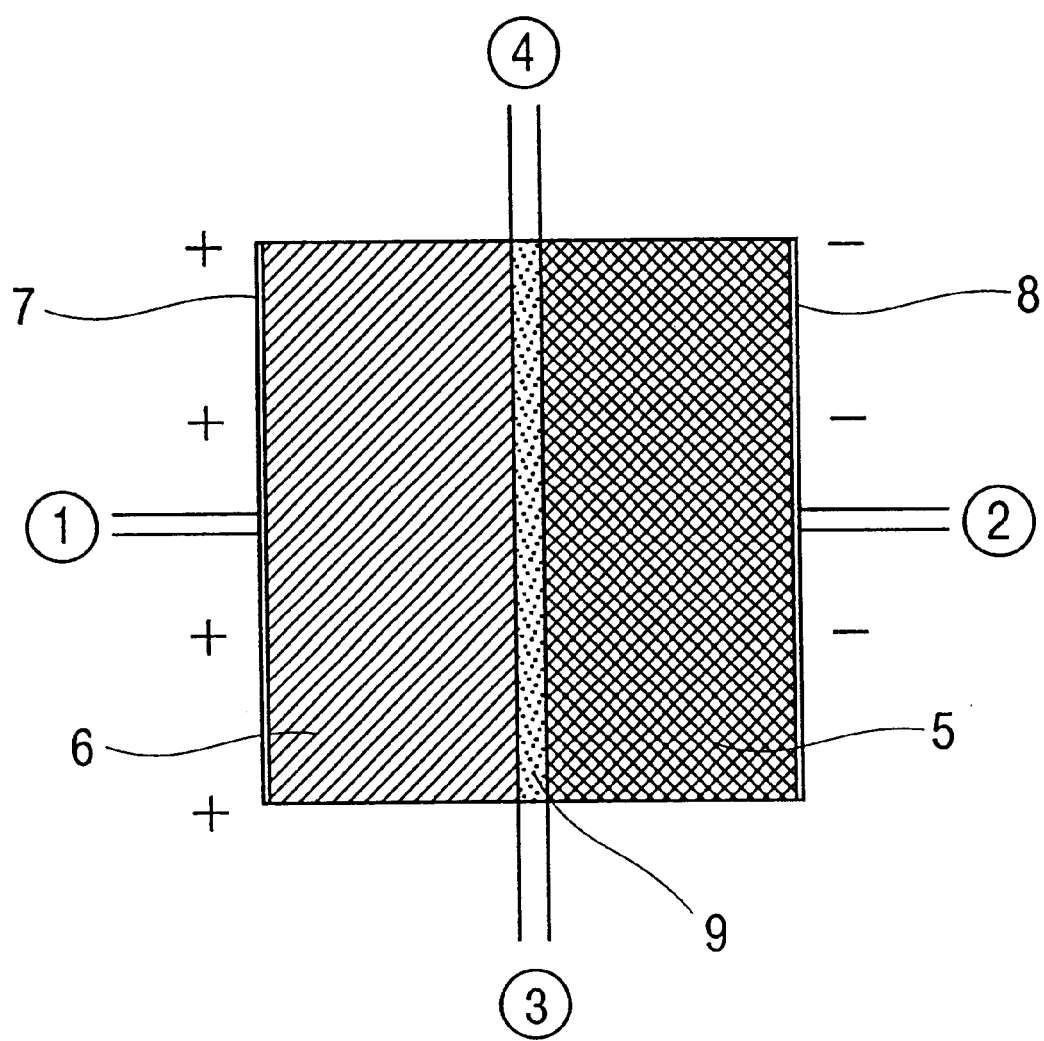
FIG. 1 is a schematic of one embodiment of a electrochemical cell according to the invention.

Referring to FIG. 1, this schematic demonstrates the general principle of the method of ion exchange material regeneration according to the present invention for a pair of separate regions or beds of cation and anion exchange resin. A bed of anion exchange resin 5 and a bed of cation exchange resin 6 are placed between a pair of anode 7 and cathode 8 electrodes. Water is provided to the beds 5 and 6 through input ports 1 and 2 and exits through output port 3. If an appropriate electric potential is applied across the anode 7 and the cathode 8, and there is water in the vicinity of the two electrodes 7 and 8, the following electrochemical processes take place:

Oxidation (at the anode)

$$2H_2O \rightarrow O_2 + 4H^+ + 4e$$

Reduction (at the cathode)

$$2H_2O + 2e \rightarrow H_2 + 2OH^-$$

Overall Electrochemical Reaction $$6H_2O \rightarrow 2H_2 + O_2 + 4H^+ + 4OH^-$$

The net result is that water is split into hydrogen and oxygen, and in addition. $H^+$ ions are generated at the anode 7, and $OH^-$ ions are generated at the cathode 8. For each electron passed, one equivalent of $H^+$ and one equivalent of $OH^-$ are generated. The generated ions can then undergo ion exchange with cations and anions (salts) associated with the ion exchange resins in the cell. The exchanged cations and anions (salts) migrate under the influence of the electric potential difference, and meet at the interface 9. In different configurations, the interface 9 may comprise a porous spacer, a cavity formed by physical separation of the two resin beds, an intermediate boundary of some spacer material (such as ion exchange resin or inert material) or may simply represent the interface between the two resin beds. The cations and anions meet in this region and some means is afforded for them to flow out of the cell in a liquid stream (aqueous or other).

It is possible to configure this system in such a way that it can be used both to desalt an aqueous solution (in the operating mode), and to regenerate the ion exchange resins, without needing to disturb the resin beds, or to remove resin from the cell.

Figure 2:
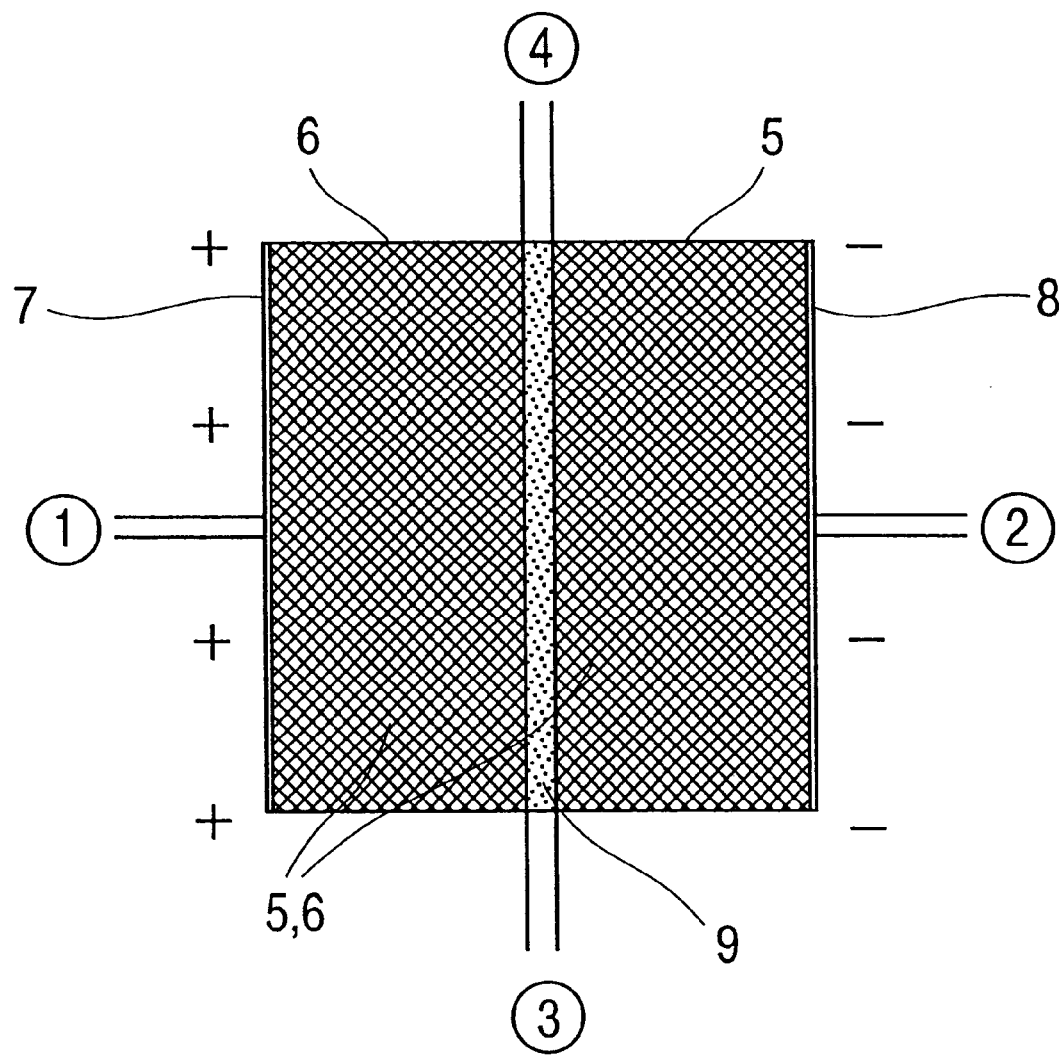
FIG. 2 is a schematic of another embodiment of a electrochemical cell according to the invention.

For regeneration of a system involving beds of mixed (cationic plus anionic) ion exchange resin, a similar system has been devised. The overall configuration is shown in FIG. 2. In this case, the regeneration proceeds in two stages. In the first stage of regeneration, the system operates as shown in FIG. 2, in the second stage, the polarity of the electrodes is reversed. The processes are described in detail below, and shown in FIG. 3 (dual bed system) and FIG. 4 (mixed bed system). In both figures the following represent the two ion exchange resins in their different forms.

A represents anion exchange resin in the "exhausted" form

OH represents anion exchange resin in the "regenerated" form

C represents cation exchange resin in the "exhausted" form.

II represents cation exchange resin in the "regenerated" form.

FIG. 3(*a*) shows the pair of separate resin beds, with the left hand compartment 6 containing anion exchange resin, and the right hand compartment 5 containing cation exchange resin. Both beds 5 and 6 are shown in their fully exhausted state; that is there is substantially no cation exchange resin in the $H^+$ state and no anion exchange resin in the $OH^-$ state. It will be appreciated, however, that the resin can be in a partially or fully exhausted state, and regeneration can be carried out partially or fully.

When a suitable potential difference is applied across the two electrodes 11 and 12 as shown in FIG. 3(*b*), $OH^-$ is generated at the left hand electrode 11 (the cathode, marked "−"), and $H^+$ is generated at the right hand electrode 12 (the anode, marked "+"). Under the influence of the electric field, those ions migrate away from their respective electrodes through the resin beds. As the $OH^-$ ions migrate through the left-hand compartment 6, they replace the anions associated with the anion exchange resin, so the resin is converted to the $OH^-$ form. The anions that are released also migrate together with any surplus $OH^-$ in the direction of the anode 12. As the $H^+$ ions migrate through the right hand compartment 5, they replace the cations associated with the cation exchange resin, so the resin is converted to the $H^+$ form. The cations that are released also migrate together with any surplus $H^+$ in the direction of the cathode 11. The cations and anions meet at the interface 9, any equivalent amounts of $H^+$ and $OH^-$ that are present neutralise each other to form water, and the remainder of the ionic species (salts) can be removed through exit port 3. To assist in this regard, it is preferred to have at least a minimum flow of water in through ports 1 and 2, as for every mole of $H^+$ and $OH^-$ generated, 1.5 moles of water are consumed.

Figure 4A:
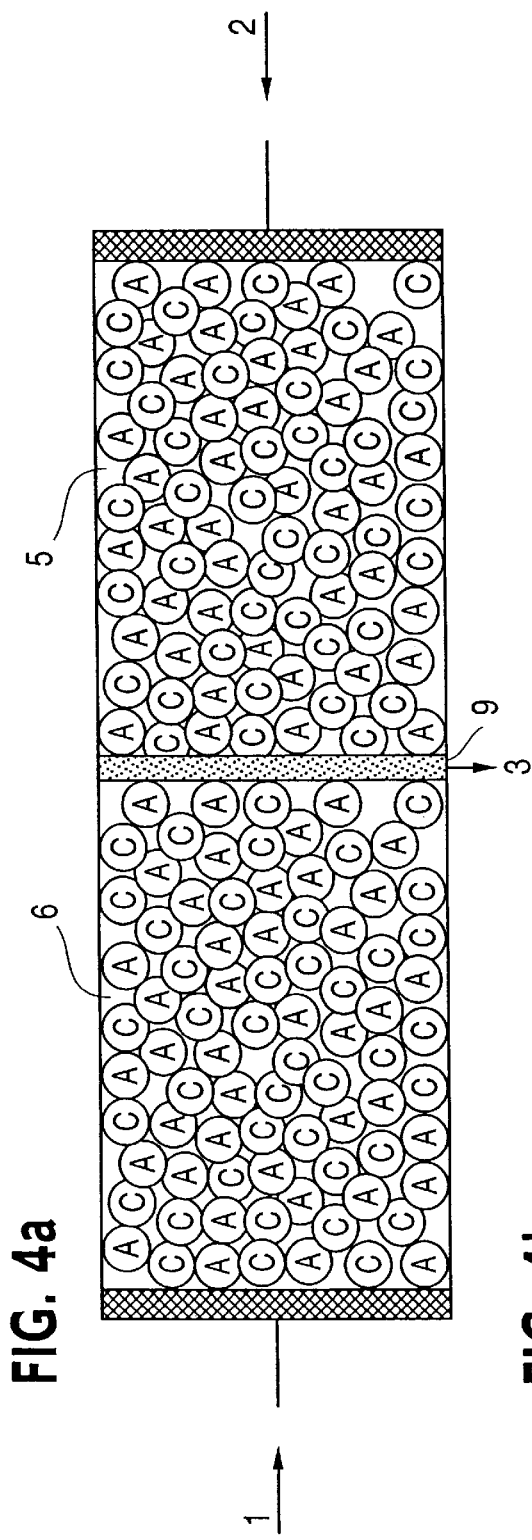
FIGS. 4a, 4b and 4c are schematics illustrating the operation of the electrochemical cell of FIG. 2.
Figure 4B:
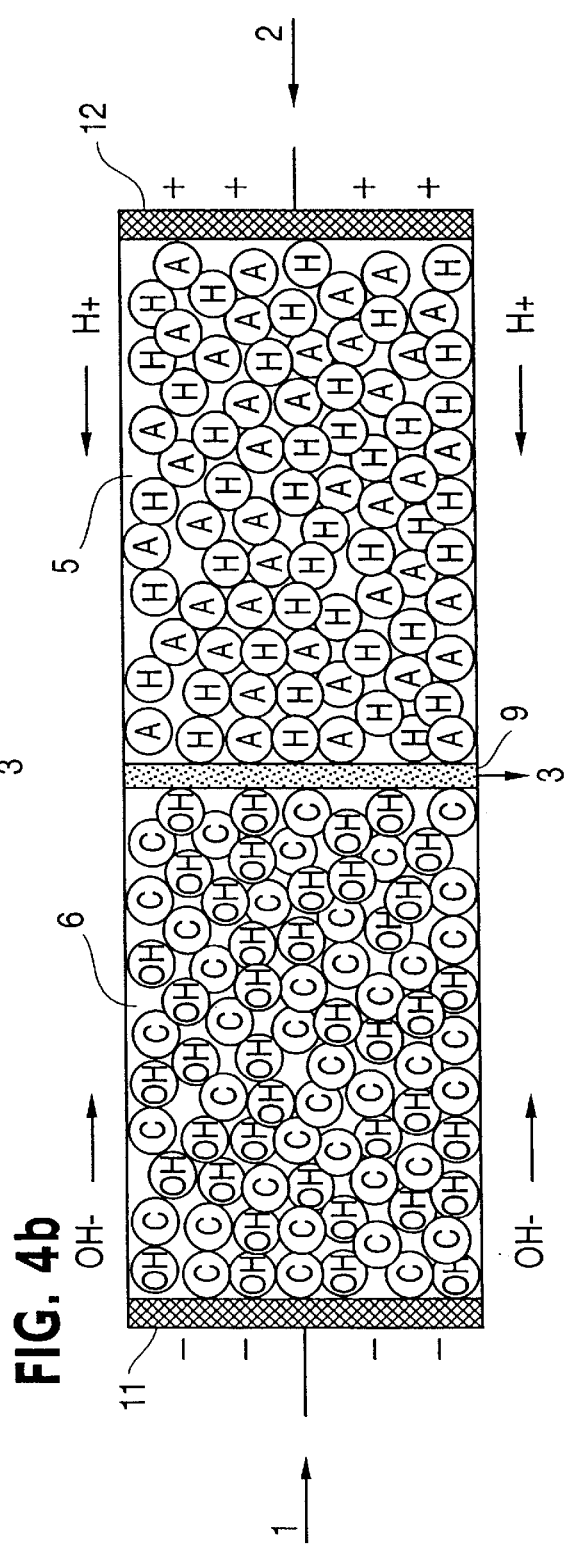
Figure 4C:
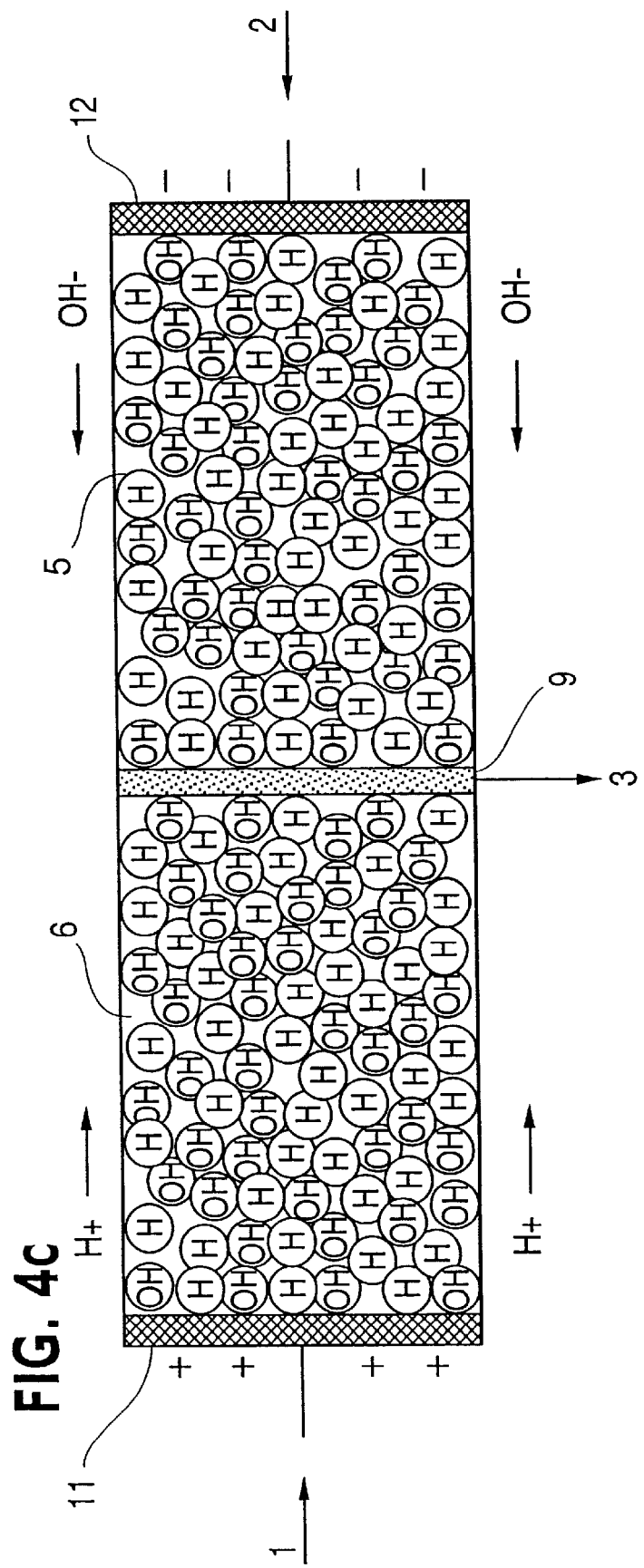

FIG. 4(*a*) shows the configuration relevant for a mixed bed system. In this case, both the left- and the right-hand compartments 6 and 5 are filled with a mixture of anion and cation exchange resins. Both beds are shown in their fully exhausted state; that is, there is no cation exchange resin in the $H^+$ state and no anion exchange resin in the $OH^-$ state. It will be appreciated, however, that the resin can be in a partially or fully exhausted state, and regeneration can be carried out partially or fully.

When a suitable potential difference is applied across the two electrodes as shown in FIG. 4(*b*), $OH^-$ is generated at the left hand electrode 11 (the cathode, marked "−"), and $H^+$ is generated at the right-hand electrode 12 (the anode, marked "+"). Under the influence of the electric field, these ions migrate away from their respective electrodes, through the resin beds. As the $OH^-$ ions migrate through the left-hand compartment 6, they replace the anions associated with the anion exchange resin, so the resin is converted to the $OH^-$ form. The anions that are released also migrate together with any surplus $OH^-$ in the direction of the anode 12. The anions have no effect on the state of the cation exchange resin in the compartment As the $H^+$ ions migrate through the right hand compartment 5, they replace the cations associated with the cations exchange resin, so the resin is converted to the $H^+$ form. The cations that are released also migrate with any surplus $H^+$ ions in the direction of the cathode 11 The cations have no effect on the state of the anion exchange resin in the compartment. The anions and cations travelling through the left and right hand compartments 6 and 5 respectively, meet at the interface 9, and any equivalent amounts of $H^+$ and $OH^-$ that are present neutralise each other to form water, and the remainder of the ionic species call be removed through exit port 3. To assist in this regard, it is preferable to have at least a minimum flow of water in through ports 1 ant 2, as for every mole of $H^+$ and $OH^-$ generated, 1.5 moles of water are consumed.

The anion exchange resin in the left-hand compartment 6 of FIG. 4(*b*) and the cation exchange resin in the right hand compartment 5 of FIG. 4(*b*) are converted to the $OH^-$ and $H^+$ forms respectively, any additional current flow generates equivalent amounts of $H^+$ and $OH^-$ which migrate through the resin beds and neutralise each other as they meet. At this stage, the polarity of the two electrodes is reversed, and H⁺ and OH⁻ are generated at the left hand electrode 11 and right hand electrode 12 respectively, as shown in FIG. 4(*c*).

As described previously, the ions migrate toward the middle of the cell, and they have the ability to replace the cations and anions that are associated with the cation exchange and anion exchange resins in the left hand compartment 6 and right hand compartment 5, respectively. The anions and cations travelling through the right hand compartment 5 and left hand compartment 6 respectively, meet at the interface 9, any equivalent amounts of H⁺ and OH⁻ that are present neutralise each other to form water, and the remainder of the ionic species can be flushed away through exit port 3. In order to assist in this regard, it is preferred to have at least a minimum flow of water in through ports 1 and 2, as for every mole of H⁺ and OH⁻ generated, 1.5 moles of water are consumed.

EXAMPLES

Figure 5:
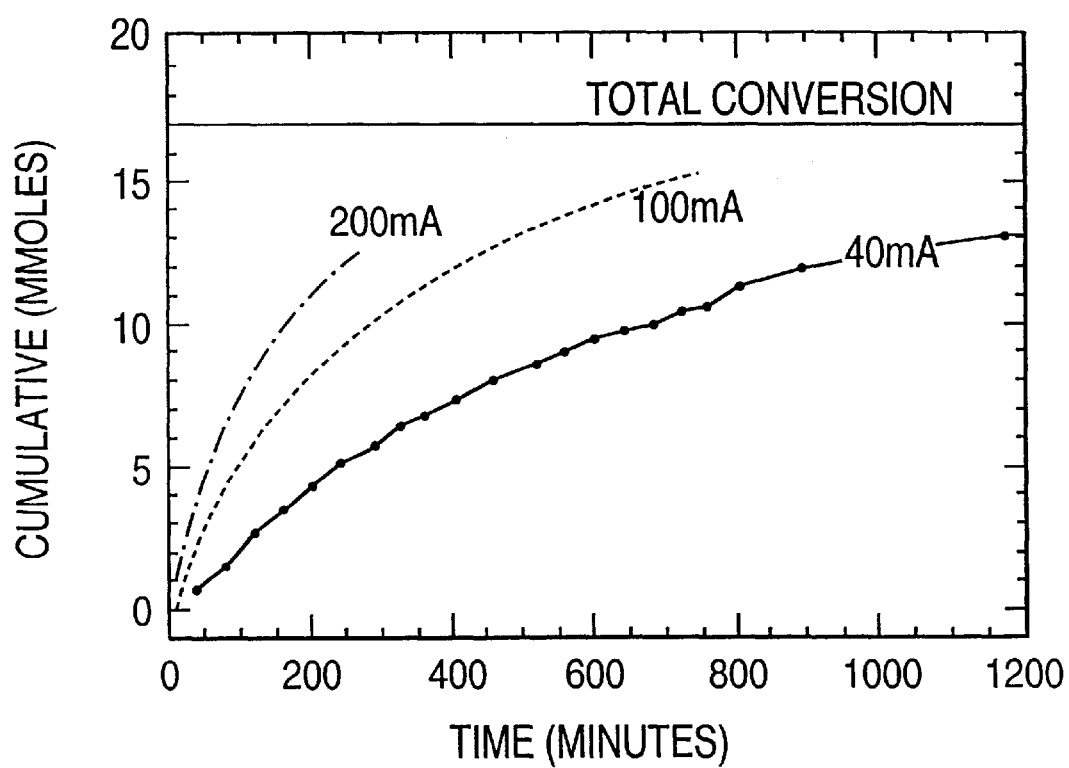
FIG. 5 shows a graph of the time dependence of ion exchange resin regeneration as a function of density.

The following examples refer to a cylindrical electrochemical cell with the features shown in FIG. 1. The interface in this cell was a porous polypropylene frit. The right-hand compartment 5 and the left-hand compartment 6 were filled respectively with Amberlite IRA-420™ strong anion exchange resin (15–50 mesh ASTM) and Amberlite 1R-120™ strong cation exchange resin (15–50 mesh ASTM). These resins are used as an example only, and the invention is not restricted to, or specific for, any particular ion exchange resins or materials. The ion exchange capacity of the resins in each compartment was –17 millimoles. The resins had been converted to the Cl⁻ and Na⁺ forms respectively, by standard chemical methods, and were thoroughly washed with deionised water to remove any residual salts. The electrodes 7 and 8 were platinum coated to titanium mesh (6 cm diameter). The electrodes were placed in intimate contact with the resin, and were held in place by a pair of endplates which were clamped to the cell, forming a sealed unit. High purity deionised water was pumped into the cell through ports 1 and 2, and flowed out through port 3. A galvanostat was used to apply a constant current across the platinum coated titanium mesh electrodes. Water was pumped into the cell through ports 1 and 2, and the effluent from port 3 was collected. The pH, conductivity, and Na⁺ ion concentration of the effluent solution were monitored, and the current and potential were recorded. The results for three different current densities are shown in FIG. 5. This graph shows the cumulative number of moles of Na⁺ ions collected through port 3 as a function of time.

Figure 6:
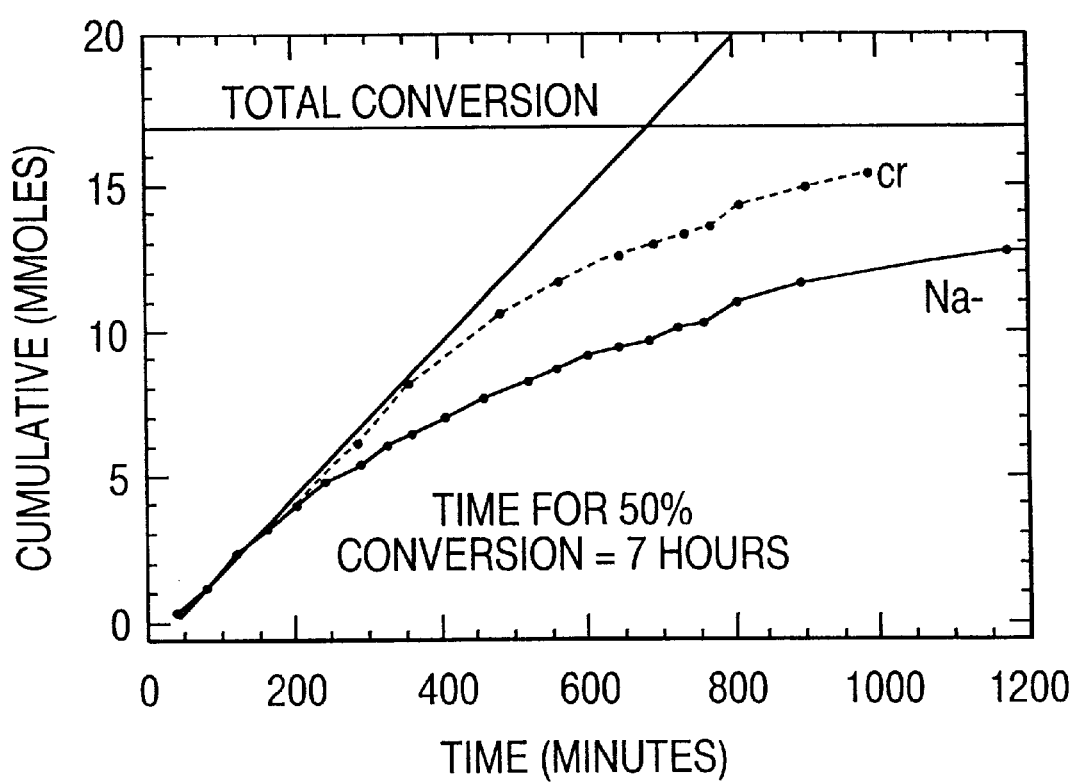
FIG. 6 shows a graph of the time dependence of ion exchange resin regeneration at a particular current density of 40 mA.
Figure 7:
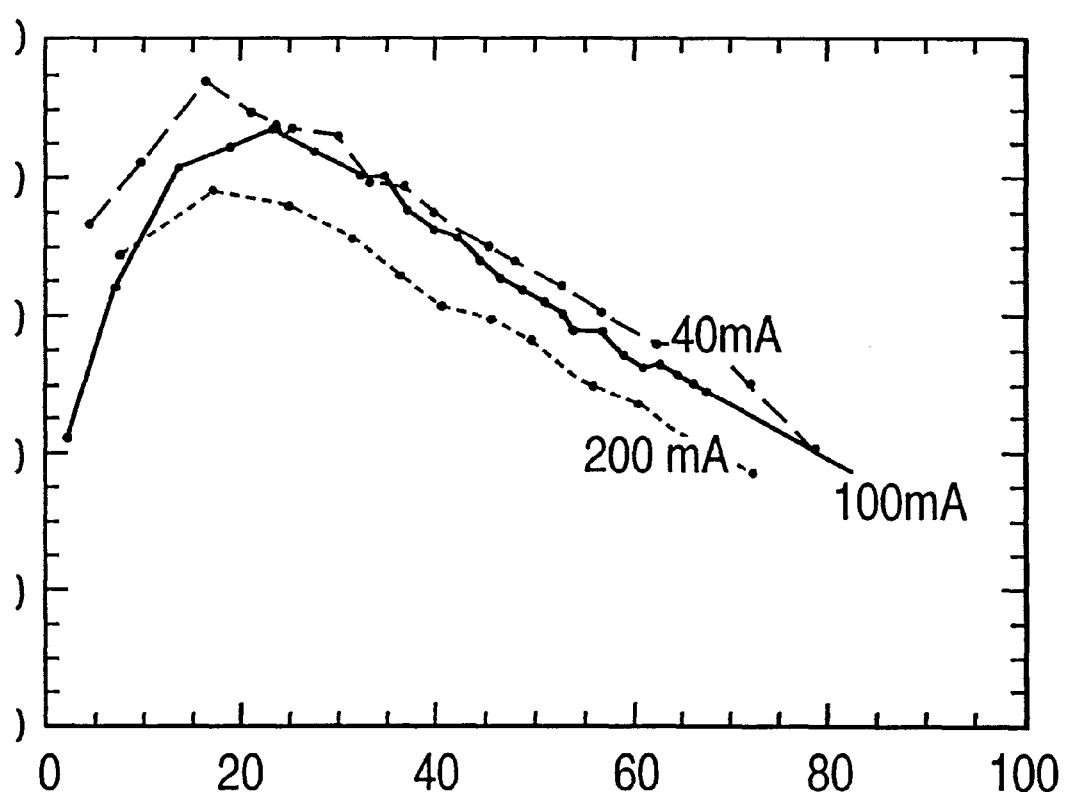
FIG. 7 shows a graph of Coulombic efficiency of ion exchange resin regeneration as function of current density.

FIG. 6 shows the cumulative number of moles of both Na⁺ and Cl⁻ ions collected through port 3 as a function of time for a current flow of 40 mA. FIG. 7 shows the electrochemical efficiency of operation of the cell. For each mole of electrons, one mole of H⁺ and one mole of OH– are produced. If each mole of electrons led to the regeneration of one mole of cation exchange resin and one mole of anion exchange resin, the electrochemical efficiency of the cell would be 100%. In FIG. 7, the overall percentage coulombic efficiency of cation exchange resin conversion is plotted as a function of the percentage of the cation exchange resin in the cell that has been regenerated.

FIG. 8 shows a preferred embodiment of the present invention in which the interface between the two beds of resin is formed by a Tee valve 13 where the liquid flow passages 18 in the valve are substantially filled with anion and cation exchange resin in a mixed or unmixed stale. In the resin regeneration mode (FIG. 8(*a*)), this valve 13 is turned such that each end of the flow through passage 18 of the valve 13 is open to one of the resin beds and that the flow passage normal to this is open to a port through which cations and/or anions and water (waste salt solution) can flow. When the system is being used to purify water (FIG. 8(*b*)), the valve 13 is turned such that the liquid flow passage 18 of the valve 13 is no longer open to the resin beds. This prevents the liquid firm flowing in an undesirable fashion between the two resin beds in the water purification part of the cycle. With the configuration shown in FIG. 8, the resin is regenerated in a countercurrent fashion (i.e. the water flow and the ion between the two resin beds in the water purification part of the cycle. In the purification mode, water is fed through a further input port 16 at the base of bed 5 and exits trough port 15 before being fed through the other bed 6 by means of port 17. The purified water exits through port 14. Ports 16 and 17 are closed when the cell is in the regeneration mode. With the configuration shown in FIG. 8, the resin is regenerated in a countercurrent fashion (i.e. the water flow and the ion flow both proceed through the resin beds in one direction in the purification cycle, and both proceed in the opposite direction through the resin beds in the regeneration mode).

Although in the descriptions above, the cell appears as a cylinder, the success of the process is not dependent upon, or restricted to, this particular geometry. Similarly, the size of the cell is not a limiting factor. For example, similar efficiency has been achieved in a cylindrical cell of approximately five times this capacity. Furthermore, similar efficiency has been achieved in a cell in a U-tube configuration rather than a straight cylinder with a capacity of approximately ten times this capacity. Similar efficiency has also been achieved in a cell where the polypropylene frit is replaced by a pair of nylon meshes holding the two resin beds apart (i.e. where the cavity is simply filled with liquid). The rate of water flow through the cell and the current have also been varied with no drop in electrochemical efficiency.

The system described is operated in a manual fashion, however, it will be appreciated that with the use of suitable sensors and control systems the operation of the device could be made to be automatic. Examples of such equipment are conductivity cells to monitor the output water purity, valve actuators and microprocessor control circuitry.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A method of treating an ion exchange material, the method comprising:
    (a) positioning at least two regions of ion exchange material between an anode and cathode electrode, wherein at least a portion of the two regions being separated by a non-ion specific permeable interface;
    (b) supplying water in a nonparallel fashion through the electrodes to the at least two regions;
    (c) supplying an electric potential between the electrodes thereby causing generation of hydrogen ions at the anode and hydroxide ions at the cathode, which ions are caused to move through each region towards the oppositely charged electrode and thereby displacing at least a portion of any anions or cations associated with the ion exchange material in each region such that the displaced anions and cations are also caused to move through the regions towards the oppositely charged electrode; and (d) removing at least some of the anions and cations formed during step (c) which reach the interface.

2. The method according to claim 1 wherein one region includes an anion exchange material and the other region includes a cation exchange material.

3. The method according to claim 2 wherein the region including the anion exchange material is positioned near the cathode and the region including the cation exchange material is positioned near the cathode.

4. The method according to claim 2 wherein the anions and cations associated with the ion exchange material and removed are salts accumulated on the ion exchange material during deionisation treatment of water.

5. The method according to claim 1 wherein the at least two regions include a mixture of anion and cation exchange materials.

6. The method according to claim 5 wherein after applying the potential for a period of time, the polarity of the electrodes is reversed and a second potential is applied.

7. The method according to claim 1 wherein simultaneous electrochemical regeneration of the ion exchange material in the at least two regions occurs.

8. The method according to claim 1 wherein the non-ion specific permeable interface is selected from the group consisting of non-ion selective membrane, frit, porous spacer, cavity formed by physical separation of the two regions of ion exchange material, inert material, valve arrangement, and physical boundary between the two regions.

9. The method according to claim 8 wherein the interface is a polypropylene frit associated with a valve to allow the removal of the ions and water from the interface.

10. The method according to claim 1 wherein the cations and/or anions and water formed during step (c) are removed prior to crossing the interface and entering the other region of ion exchange material.

11. The method according to claim 1 wherein step (b) is used as a means to remove salts dissolved in water prior to carrying out steps (c) and (d).

12. The method according to claim 1 wherein step (d) is flushing the interface with water.

13. An electrochemical cell comprising:
(a) an anode and cathode electrode;
(b) at least two regions adapted to contain ion exchange material, the regions being positioned between the electrodes;
(c) at least a portion of the two regions being separated by a non-ion specific permeable interface;
(d) means for supplying water in a nonparallel fashion through the electrode to the at least two regions;
(e) means for applying an electric potential between the electrodes; and
(f) means for removing ions, salts and water at the interface; wherein, in use, applying an electric potential causes generation of hydrogen ions at the anode and hydroxide ions at the cathode, which ions are caused to move through each region towards the oppositely-charged electrode and thereby displacing at least a portion of any anions or cations associated with the ion exchange material in each region such that the displaced anions and cations are also caused to move through the regions towards the oppositely charged electrode; and at least some of the anions and cations formed which reach the interface are removed by the flushing means.

14. The cell according to claim 13 wherein the anode is formed of platinum coated titanium and the cathode is formed of platinum coated titanium or stainless steel.

15. The cell according to claim 13 wherein one region includes an anion exchange material and the other region includes a cation exchange material.

16. The cell according to claim 15 wherein the region including the anion exchange material is positioned near the cathode and the region including the cation exchange material is positioned near the anode.

17. The cell according to claim 13 wherein the at least two regions include a mixture of anion and cation exchange materials.

18. The cell according to claim 13 wherein the non-ion specific permeable interface is selected from the group consisting of non-ion selective membrane, frit, porous spacer, cavity formed by physical separation of the two regions of ion exchange material, inert material, valve arrangement, and physical boundary between the two regions.

19. The cell according to claim 18 wherein the interface is a polypropylene frit associated with a valve to allow the removal of the ions and water from the interface.

20. The cell according to claim 13 wherein the means (f) is flushing the interface with water.

* * * * *